(12) United States Patent
Porter et al.

(10) Patent No.: US 7,008,063 B2
(45) Date of Patent: Mar. 7, 2006

(54) USE OF DISTORTING OPTICS IN IMAGING SYSTEMS

(75) Inventors: Stephen George Porter, Towcester (GB); John Lindsay Galloway, Towcester (GB)

(73) Assignee: Infrared Integrated Systems Limited, Towcester (GB)

( * ) Notice: Subject to any disclaimer, the term of this patent is extended or adjusted under 35 U.S.C. 154(b) by 167 days.

(21) Appl. No.: 10/028,940

(22) Filed: Dec. 21, 2001

(65) Prior Publication Data

US 2002/0159037 A1 Oct. 31, 2002

(30) Foreign Application Priority Data

Dec. 22, 2000 (GB) .............................. 0031572

(51) Int. Cl.
*G03B 21/00* (2006.01)

(52) U.S. Cl. .......................................... 353/69; 340/556
(58) Field of Classification Search .................. 353/69, 353/70, 122; 250/332; 359/503, 504; 340/541, 340/555, 556
See application file for complete search history.

(56) References Cited

U.S. PATENT DOCUMENTS

| | | | | |
|---|---|---|---|---|
| 3,253,505 A | | 5/1966 | Miller ............................ 88/24 |
| 4,017,160 A | | 4/1977 | Betensky .................... 350/182 |
| 4,514,631 A | * | 4/1985 | Guscott ....................... 250/342 |
| 4,707,604 A | * | 11/1987 | Guscott ....................... 250/342 |
| 4,841,284 A | * | 6/1989 | Biersdorff ................... 340/567 |
| 4,903,009 A | * | 2/1990 | D'Ambrosia et al. ....... 340/556 |
| 4,934,771 A | | 6/1990 | Rogers |
| 5,109,158 A | | 4/1992 | Horne |
| 5,220,363 A | | 6/1993 | Sato et al. .................... 353/69 |
| 5,274,406 A | | 12/1993 | Tejima et al. ................. 353/70 |
| 5,283,602 A | | 2/1994 | Kwon .......................... 353/69 |
| 5,311,024 A | * | 5/1994 | Marman et al. ............. 250/353 |
| 5,422,691 A | | 6/1995 | Ninomiya et al. ............ 353/69 |
| 5,706,062 A | | 1/1998 | Stolov ......................... 348/761 |
| 5,709,445 A | | 1/1998 | Takamoto .................... 353/70 |
| 5,929,445 A | * | 7/1999 | Barone ........................ 250/353 |
| 6,239,698 B1 | * | 5/2001 | Porter et al. ................. 340/506 |
| 6,476,859 B1 | * | 11/2002 | Galloway et al. ........... 348/164 |

FOREIGN PATENT DOCUMENTS

| | | |
|---|---|---|
| CH | 669 686 | 3/1989 |
| EP | 0 665 522 | 8/1995 |
| FR | 2 692 369 | 12/1993 |
| GB | 897361 | 5/1962 |
| GB | 1235344 | 6/1971 |
| GB | 2 123 950 | 3/1984 |
| GB | 2 298 497 | 9/1996 |
| GB | 2 343 526 | 5/2000 |
| NL | 8200015 | 8/1983 |
| WO | WO 98/08141 | 2/1998 |

OTHER PUBLICATIONS

Rudolf Kingslake, "Optics in Photography," Spie Optical Engineering Press, 1992, pp. 154–156, ISBN 0-8794-0763-1.
EP Communication, Application No. 01 310 831.1–2217, dated Jul. 20, 2003.
EP Communication, Application 01 310 831.1–2217, dated Jan. 16, 2003.
EP Search Report, Application No. 01 310 831.1–2217, dated Apr. 5, 2002.
EP Official Action, Application No. 01 310 831.1 –2217, dated Jan. 22, 2004.

* cited by examiner

*Primary Examiner*—William Dowling
(74) *Attorney, Agent, or Firm*—Moser, Patterson & Sheridan, L.L.P.

(57) ABSTRACT

An optical detection system for forming an image of a field of view in an object plane onto an image plane in which the electromagnetic radiation image is transmitted to a detector array at the image plane via an optical distorting element such as a reflector 11, so as to impose a non linear relationship between areas in the image and object planes.

9 Claims, 16 Drawing Sheets

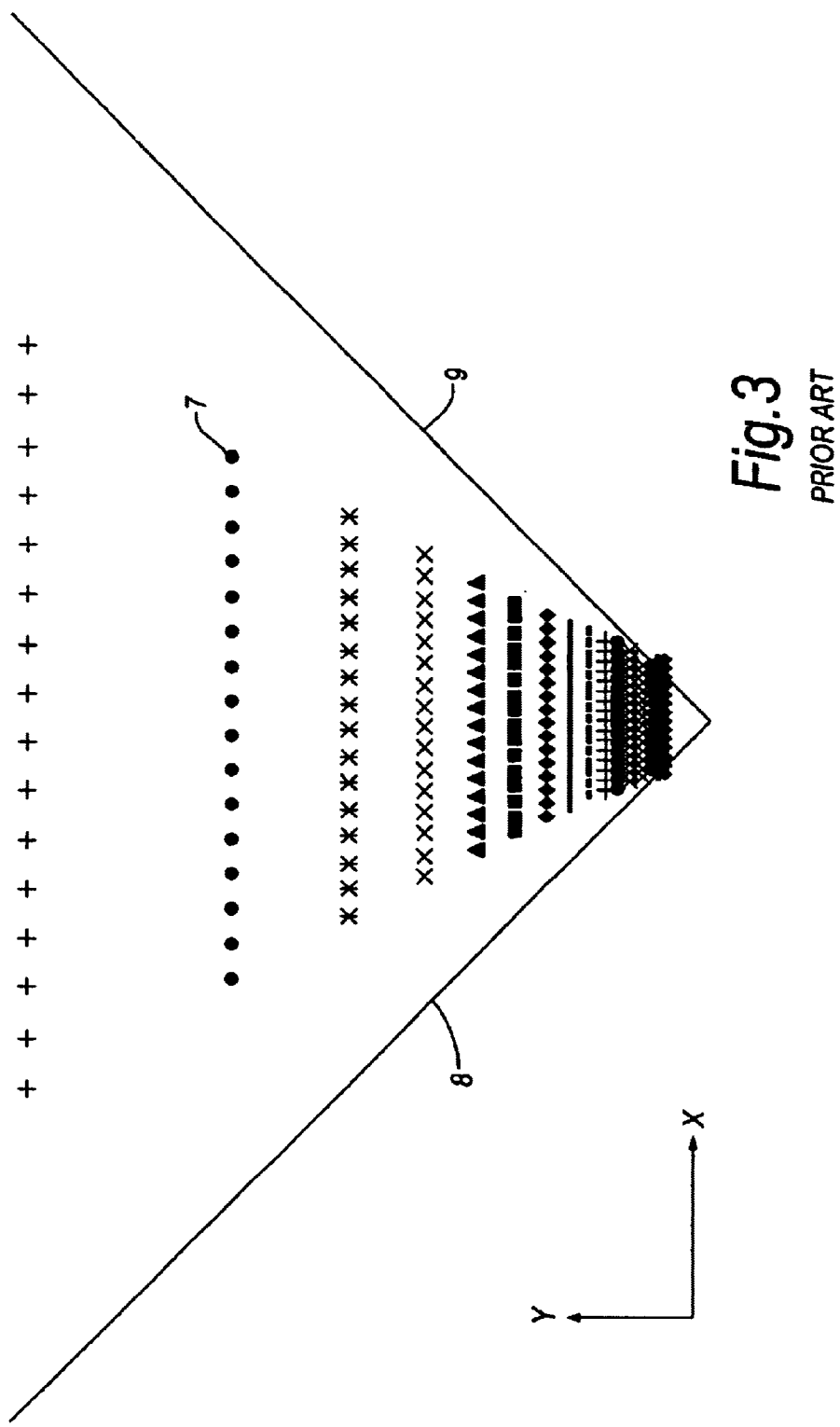

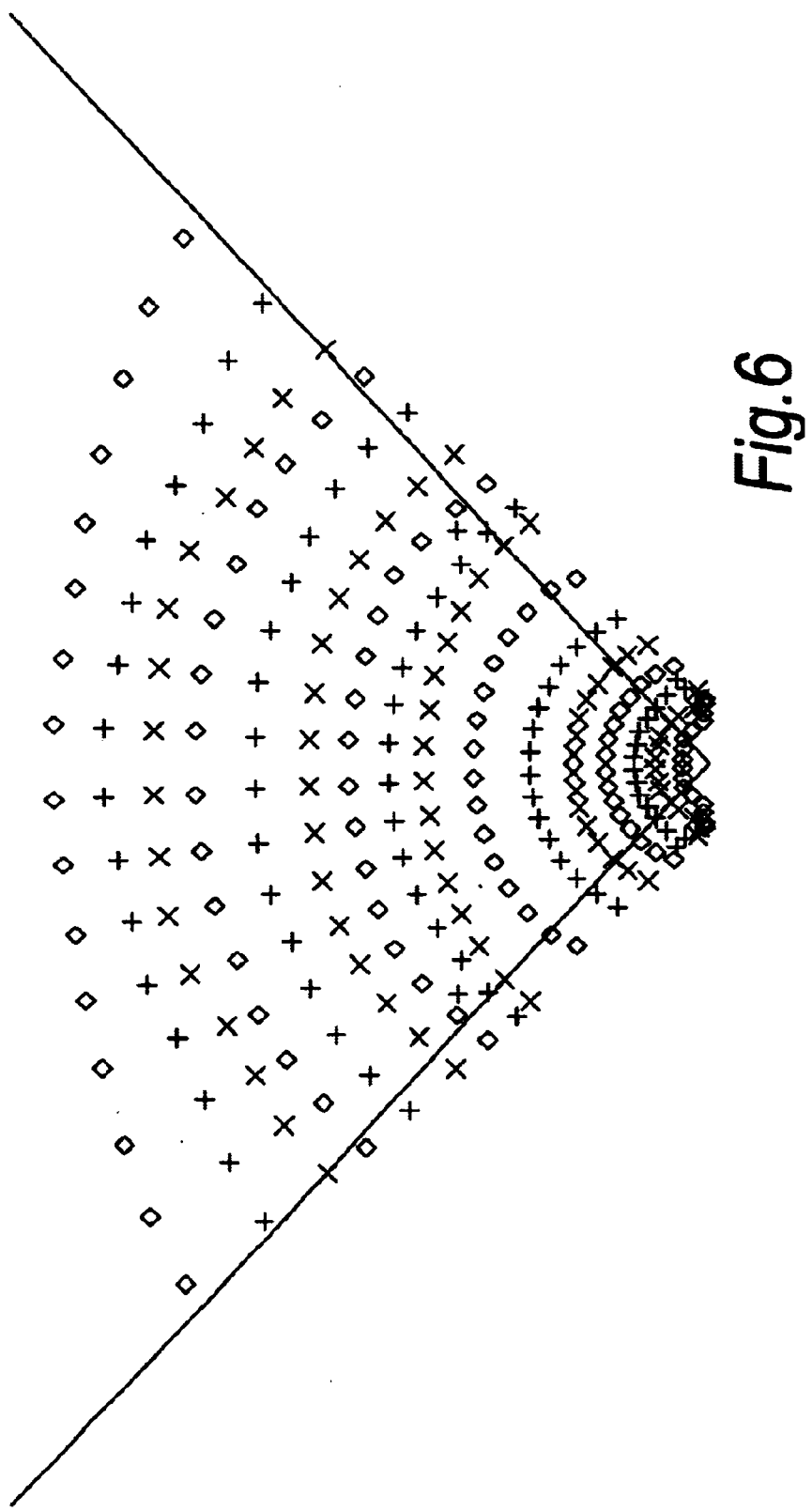

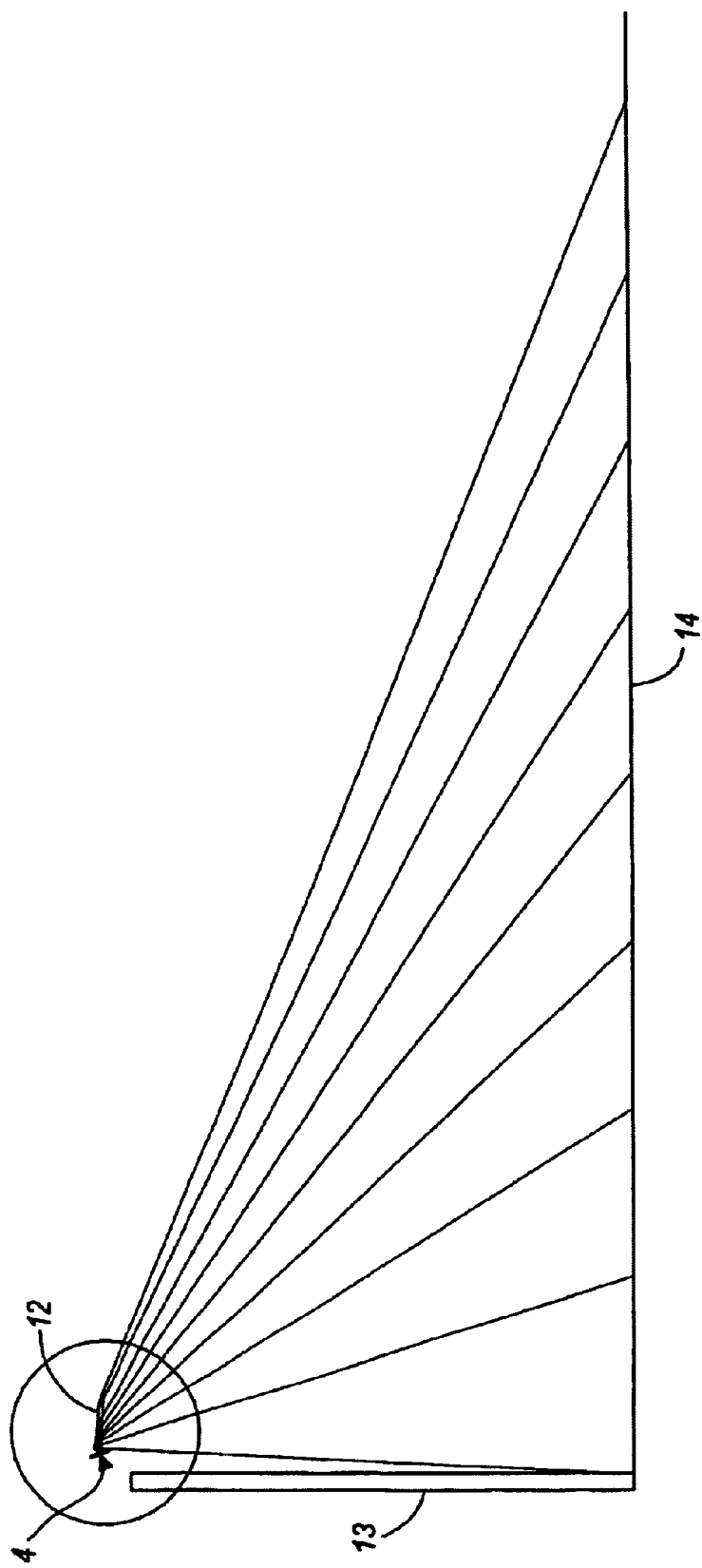

USE OF DISTORTING OPTICS IN IMAGING SYSTEMS

BACKGROUND OF THE INVENTION

1. Field of the Invention

The present invention relates to an optical imaging system for forming an image of a field of view in an object plane onto an image plane.

In conventional imaging optics, as illustrated by way of example in FIG. 1, a lens or mirror 1 is used to focus light rays 2 from an object plane 3, onto an image plane 4 and steps are generally taken to minimise optical distortions so as to produce a linear (i.e. proportional) relationship between areas of the object plane and areas of the image plane.

It is sometimes desirable to form an image on an image plane at an oblique angle to the object plane. One such arrangement is shown in FIG. 2 in which the image plane is designated by reference numeral 4 and the object plane by reference numeral 6. A practical application of this arrangement is a passive infrared intruder detector mounted on a wall, in which the object plane is the floor and the image plane is the surface of the detector. The detector is typically a two dimensional array of identical regularly spaced detector elements. It is clear from an examination of FIG. 2 that, assuming that the elements are identical and regularly spaced, certain elements of the detector array are viewing only a small area of ground whilst other elements are viewing very large areas of ground. In certain applications it would be advantageous to provide a more uniform correspondence between areas of the object plane and areas of the image plane.

Methods of correcting distortions in images when the object plane and image plane are not parallel are presented in, for example GB 2 298 497 A and U.S. Pat. No. 5,274,406. These are designed to generate a faithful reproduction of a rectangular photographic film, or other object, onto an inclined screen. In particular these methods correct for trapezoidal distortion and generate a rectangular image from a rectangular object.

There are occasions, however, when it is desirable to introduce a deliberate distortion into an image in order to enhance the performance of a detector. This may or may not be in conjunction with correcting distortions in a similar manner to the examples cited above. The problem is illustrated more clearly in FIG. 3. Using the configuration of FIG. 2, if a two dimensional array of 16×16 detector elements is used at the image plane, then the points 7 on the ground or object plane which are imaged onto the centres of the elements form an unevenly spaced array of points as illustrated in FIG. 3. (In FIG. 3 different symbols for points represent different rows of elements.) It is common practice to mount an intruder detector in a corner between two walls 8 and 9 and the requirement is to map a triangular area bounded by these walls as evenly as possible onto the square array.

This problem is not solved adequately using the prior art methods cited above as these would map a square area on the ground onto the array.

SUMMARY OF THE INVENTION

The present invention provides an optical detection system comprising a two dimensional array of regularly spaced detector elements and optical means for forming an image of a field of view in an object plane onto an image plane at which the array is located, the optical means being arranged to map a designated area of the object plane onto the array and including a distorting optical element which imposes a non-linear relationship between areas of the object plane and areas of the image plane.

The invention may be used to map onto the detector array an area having a different shape from that of the array. For example, the designated area may have the shape of a triangle or a sector of a circle or a D shape, whilst the array is square or rectangular.

Alternatively, the invention may be used to form a distorted image of a square or rectangular area onto a square or rectangular array whereby certain areas of the object plane are viewed by more detector elements than are other equally sized areas. This may enhance the operation of computer algorithms processing signals from the detector array for example if they are designed to regard certain areas of the object plane as more significant than others.

The invention has been developed for use with an infrared detector array. For such an application the image need not be visible and therefore the distortion is not disadvantageous. It should be noted that the distorting element does not disrupt the positional relationship between areas of the object and image planes and therefore it is still possible to derive position information from the image without the need for additional signal processing.

For the particular application of the intruder detector mounted in the corner of a room, the optical distorting element may be shaped so as to broaden the angular field of view in the x direction (FIG. 3) whilst in the y direction the field of view is compressed for large values of y but expanded for small values of y. This would ensure more complete and more even coverage of an area between two walls at right angles to each other.

Preferably the optical distorting element causes a more uniform correspondence between areas of the object plane and areas of the image plane than would be present without the optical distorting element. The distorting element may be a reflective surface or a refractive element. The system may include a lens for focussing the image onto the image plane. The object plane may be an area of floor or ground and the image plane may be at an acute angle to the object plane.

An embodiment of the invention will now be described by way of example and with reference to the accompanying drawings in which:

DETAILED DESCRIPTION OF THE DRAWINGS

FIG. 3 illustrates the relationship between the points on the ground plane that are imaged onto the centres of the elements in a detector array in the example shown in FIG. 2;

FIG. 6 is a diagram corresponding to FIG. 3 illustrating the effect of using the optical distorting element;

FIG. 9 is a schematic diagram showing a second example of a system according to the invention viewing the approach to a doorway;

DETAILED DESCRIPTION OF THE PREFERED EMBODIMENT

Figure 1:
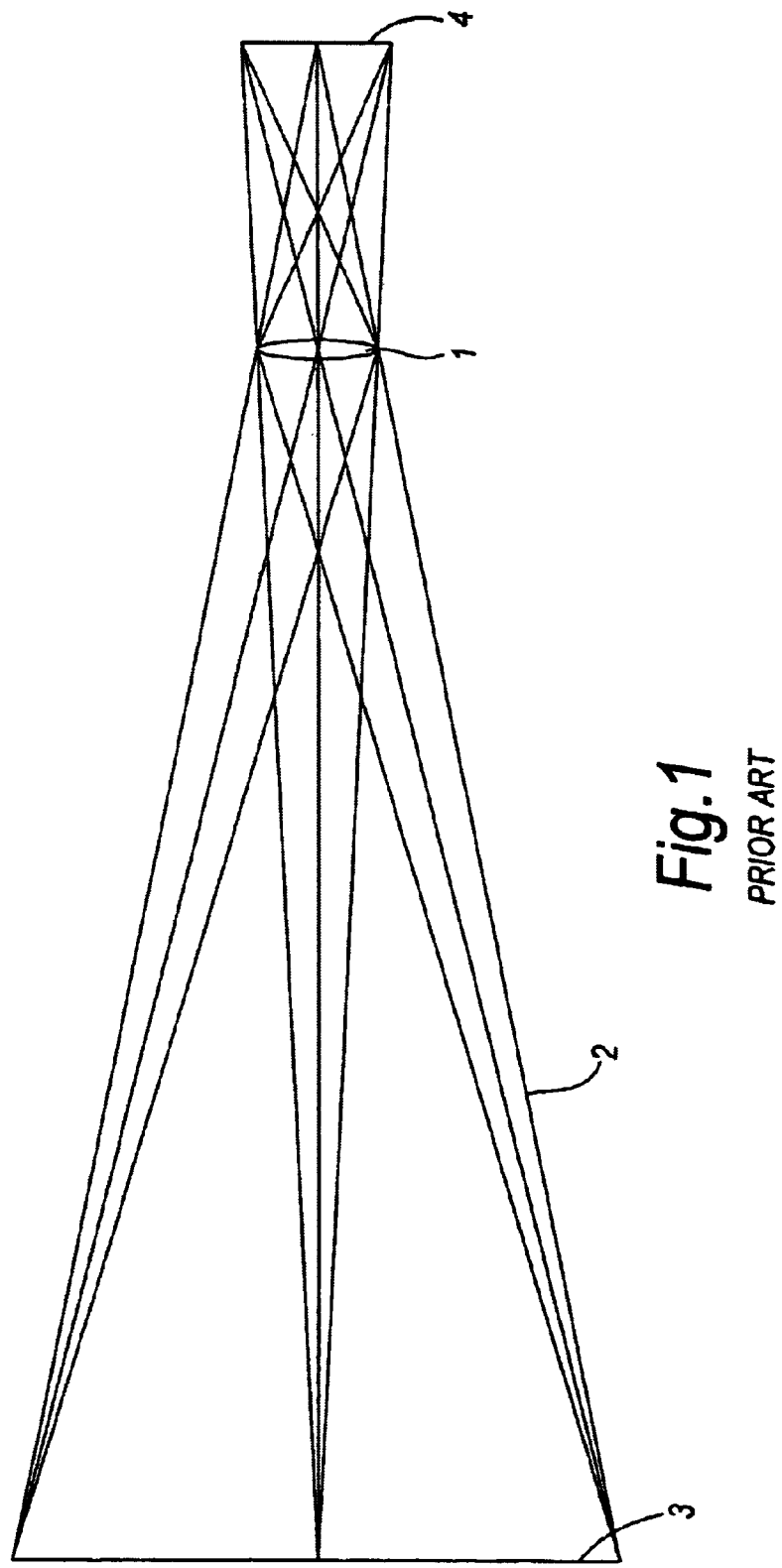
FIG. 1 is a schematic diagram showing the relationship between areas of an object and areas of an image produced by a standard lens 1.
Figure 2:
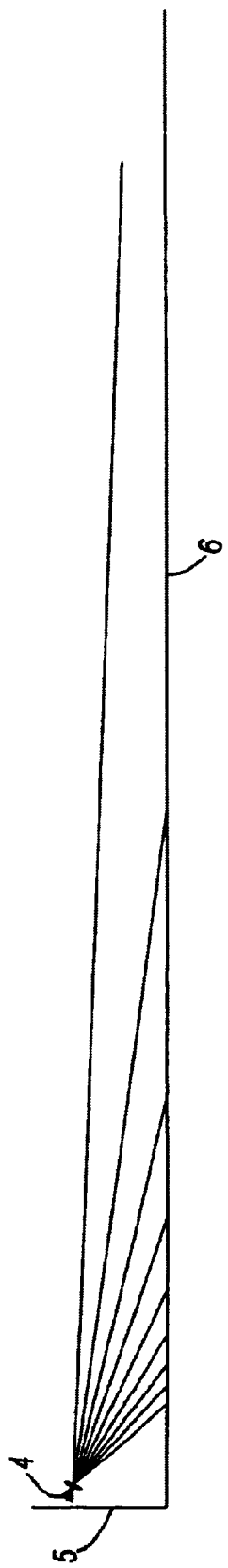
FIG. 2 illustrates the foreshortening of the image, which is caused when the image plane is at an angle to the object plane.
Figure 2A:
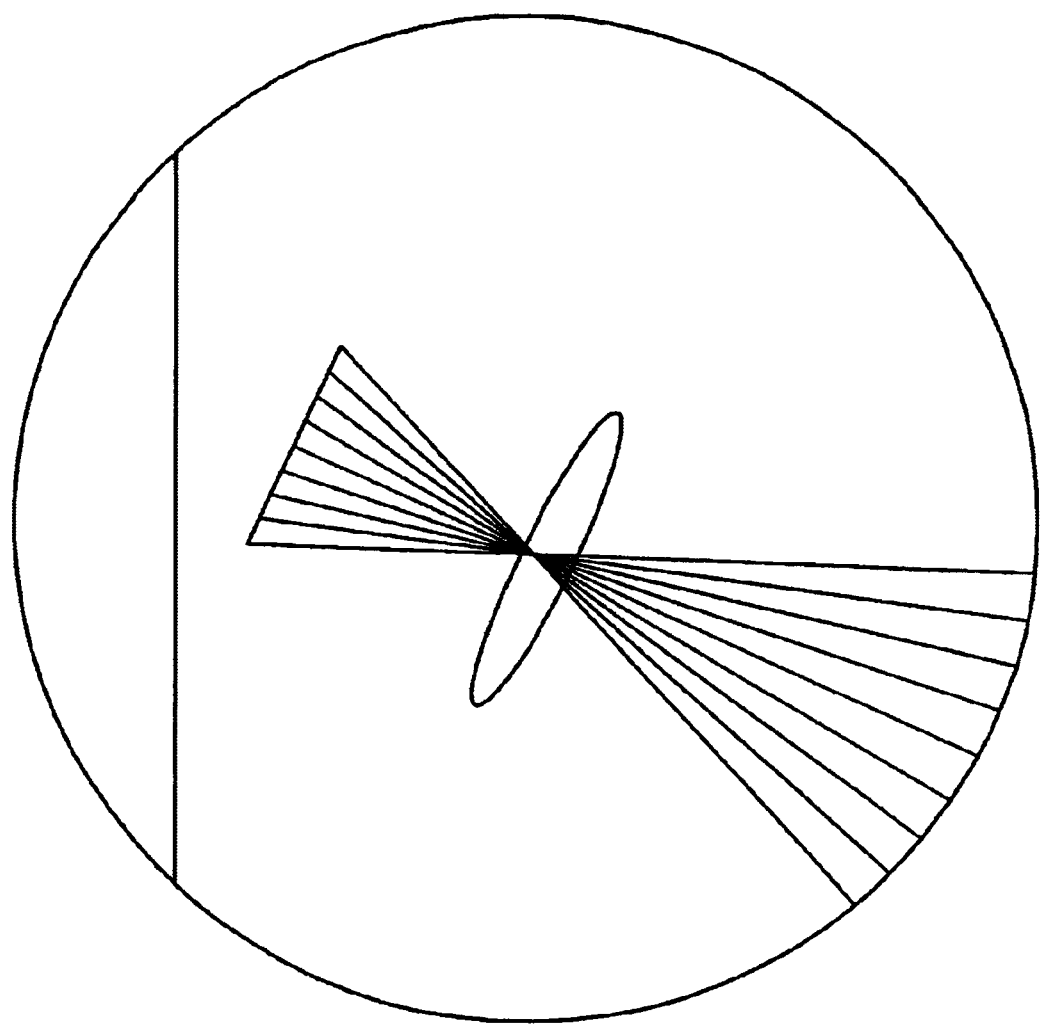
FIG. 2A is an enlarged view of the image plane and lens of FIG. 2.
Figure 4:
FIG. 4 shows an arrangement similar to FIG. 2 with the addition of a plane mirror.
Figure 4A:
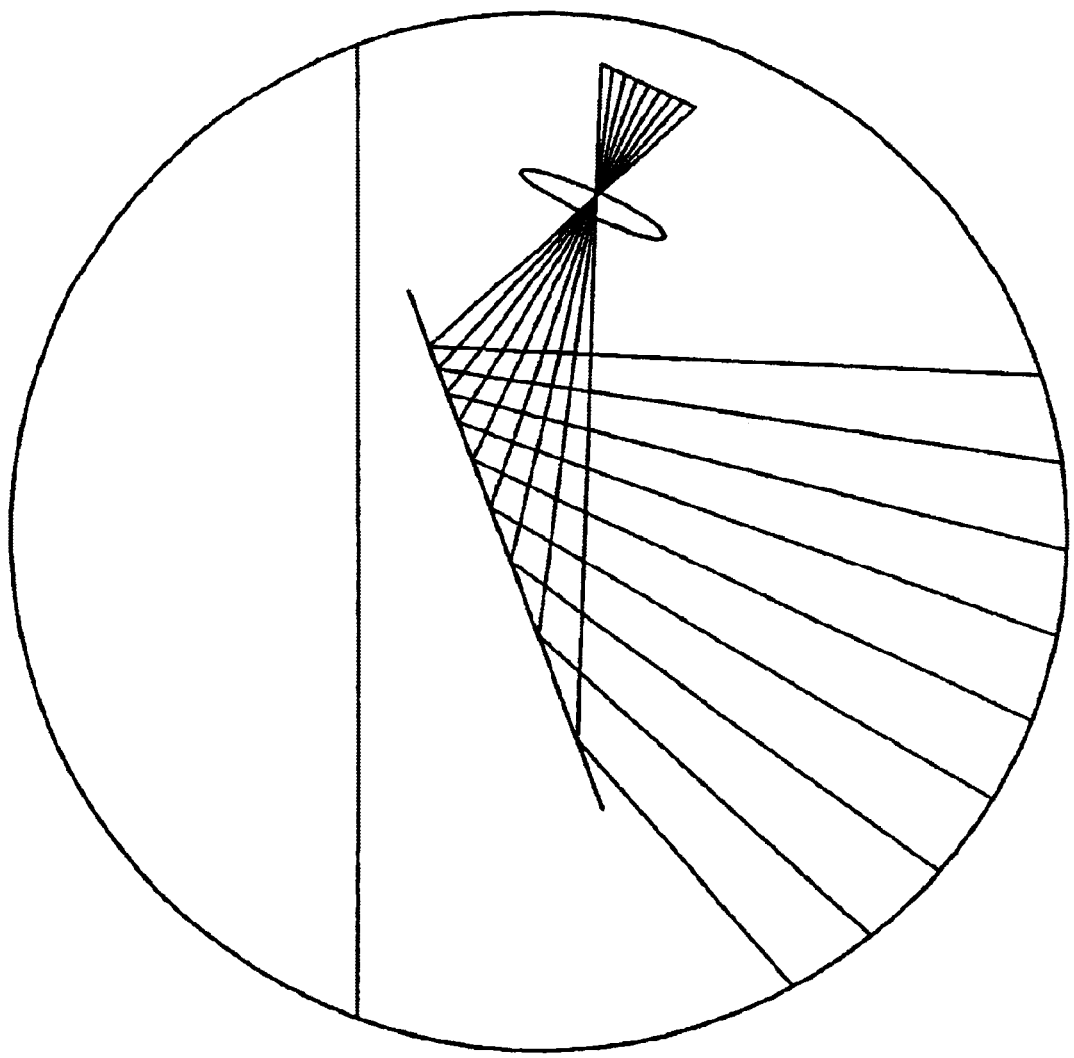
FIG. 4A is an enlarged view of the image plane and optical elements of FIG. 4.
Figure 5:
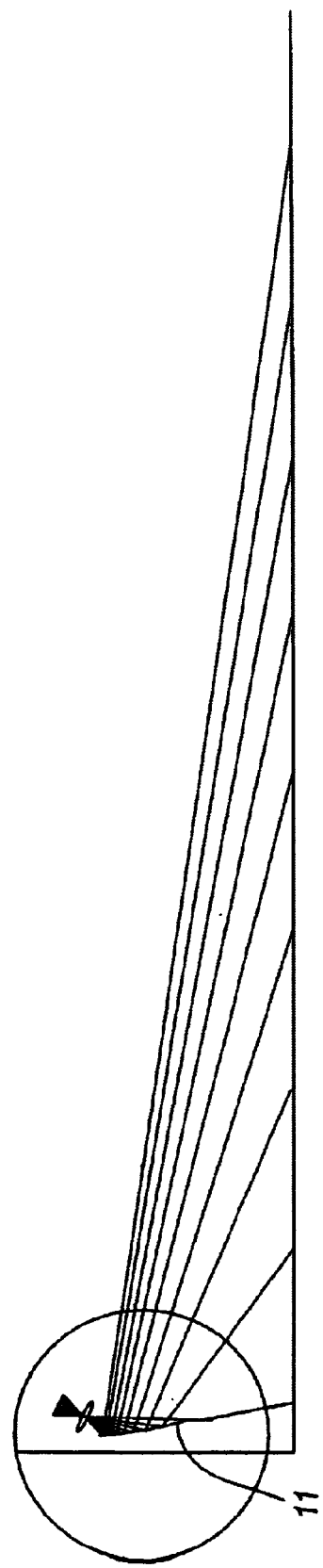
FIG. 5 is a diagram similar to FIG. 4 in which an optical distorting element is substituted for the plane mirror.
Figure 5A:
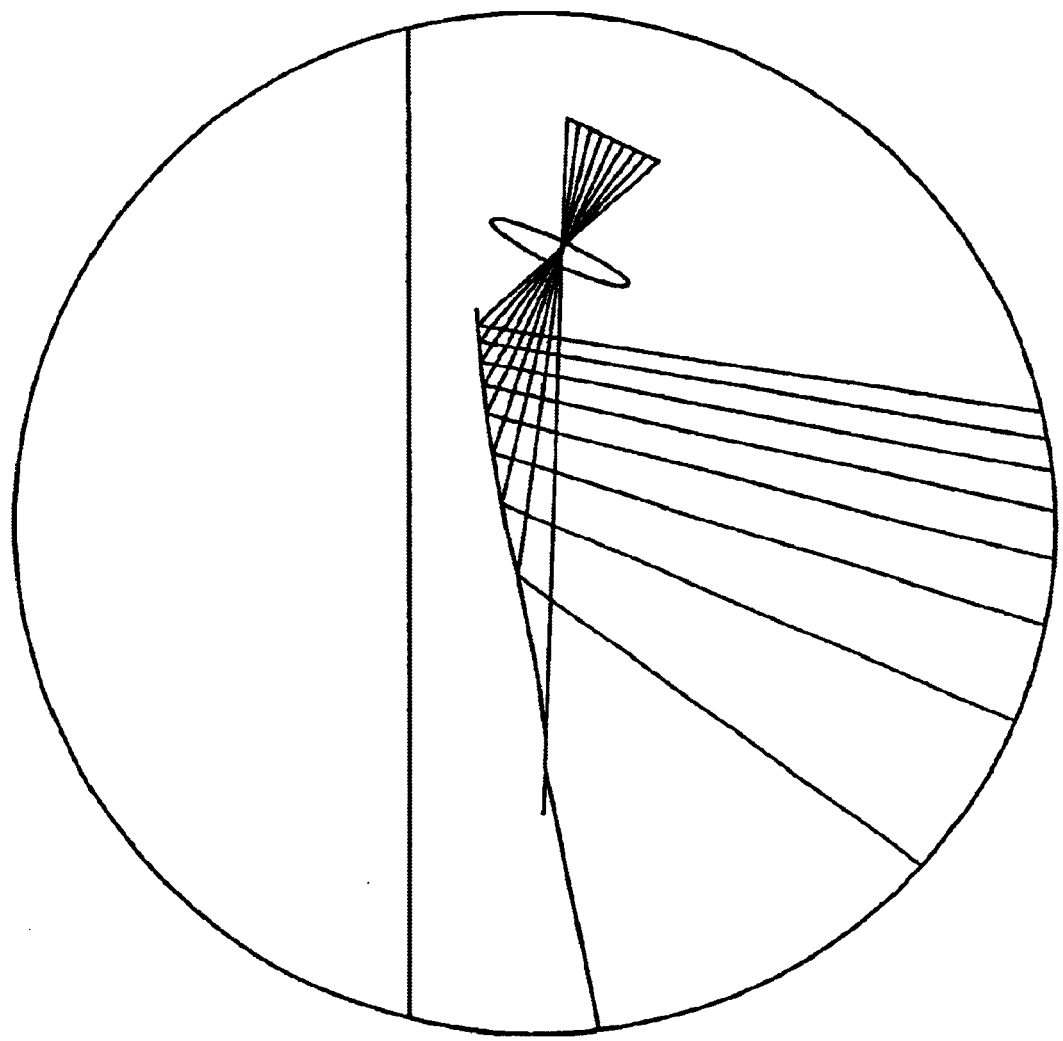
FIG. 5A is an enlarged view of the image plane and optical elements of FIG. 5.
Figure 7:
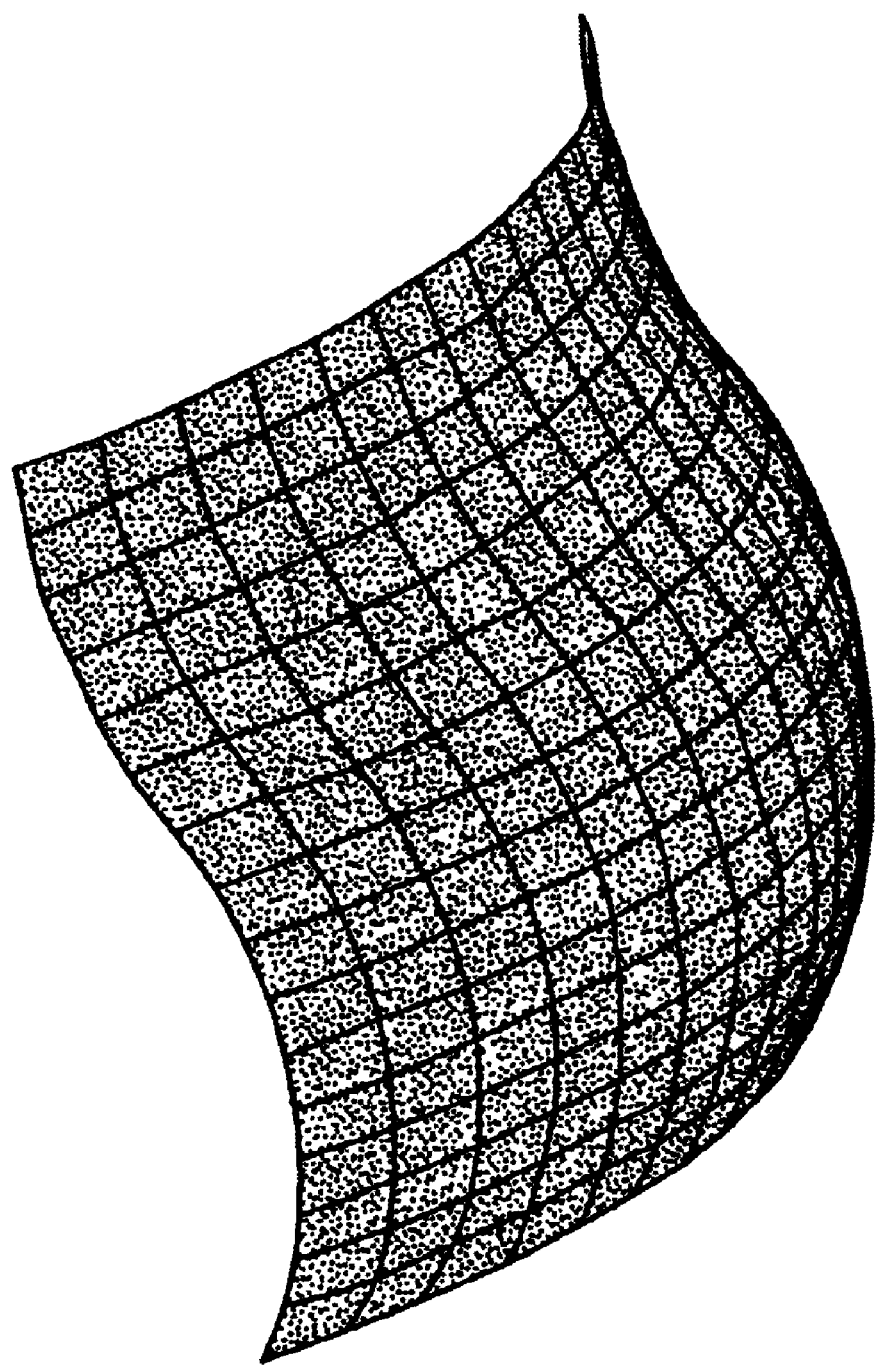
FIG. 7 is a perspective view of an optical distorting element used to produce the results shown in FIG. 6.

In the example illustrated in FIG. 5, the plane mirror 10 of FIG. 4 has been replaced by a specially designed curved mirror 11 in convex configuration which distorts the field of view giving a more even distribution over the ground plane of points relating to the centres of elements of a two-dimensional detector array (not shown). FIG. 6 is a diagram corresponding to FIG. 3, which illustrates that with the use of the mirror 11, the whole of the area between the walls can be viewed. The mirror itself is shown in perspective view in FIG. 7. The table annexed to the end of this description defines the shape of the mirror in terms of x, y and z coordinates, the individual figures giving the relative heights of points of the mirror from a ground plane. It will be noted that, in this example, the mirror is symmetrical about the x=0 axis.

It is clear from a comparison of FIGS. 3 and 6 that one effect of the mirror 11 is to spread the lines of points along the y axis for small values of y (short ranges) and bring closer together the lines of points for larger values of y (long ranges). In other words the images of far away objects are magnified more than those of close objects. To this end the mirror has along its x axis a concave portion for magnification and a convex portion to diminish the image as can be seen clearly in FIG. 7.

A second effect of the mirror is to expand the field of view in the x direction in proportion to the y value of the particular line of elements. Thus for a given value of y, a given angular movement of an object will result in its image moving through the same number of elements along a line in the x direction. This effect would not be achieved by the prior art methods of correcting for distortion described above.

Figure 8:
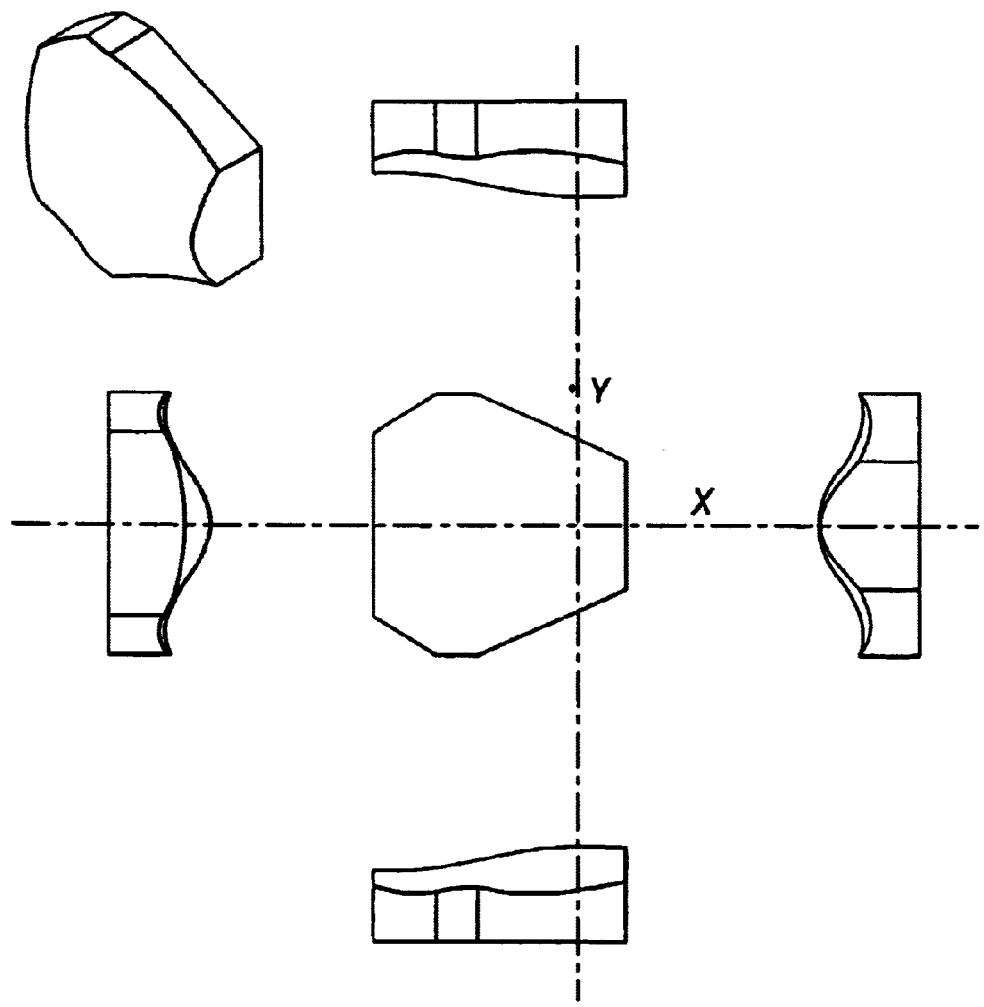
FIG. 8 shows various views of an alternative distorting element for use with an optical system viewing the approach to a doorway.

In a second example, the mirror illustrated in FIG. 8 is used. This mirror has a surface profile which is defined by the following formula, which defines the values of z for the various values of x and y indicated in the diagram, over the range $-48 \leq y \leq 8$ and $-11 \leq x \leq 11$, where all dimensions are in mm.

$$z = 7.5 \times 10^{-3} x + 4 \times 10^{-2} y + 8.75 \times 10^{-4} x\, y^2 - 2.8 \times 10^{-6} x^4 - 2.5 \times 10^{-5} y^4 - 1.5 \times 10^{-10} x^3 y^4 + 1.4 \times 10^{-11} x^4 y^4$$

Figure 9A:
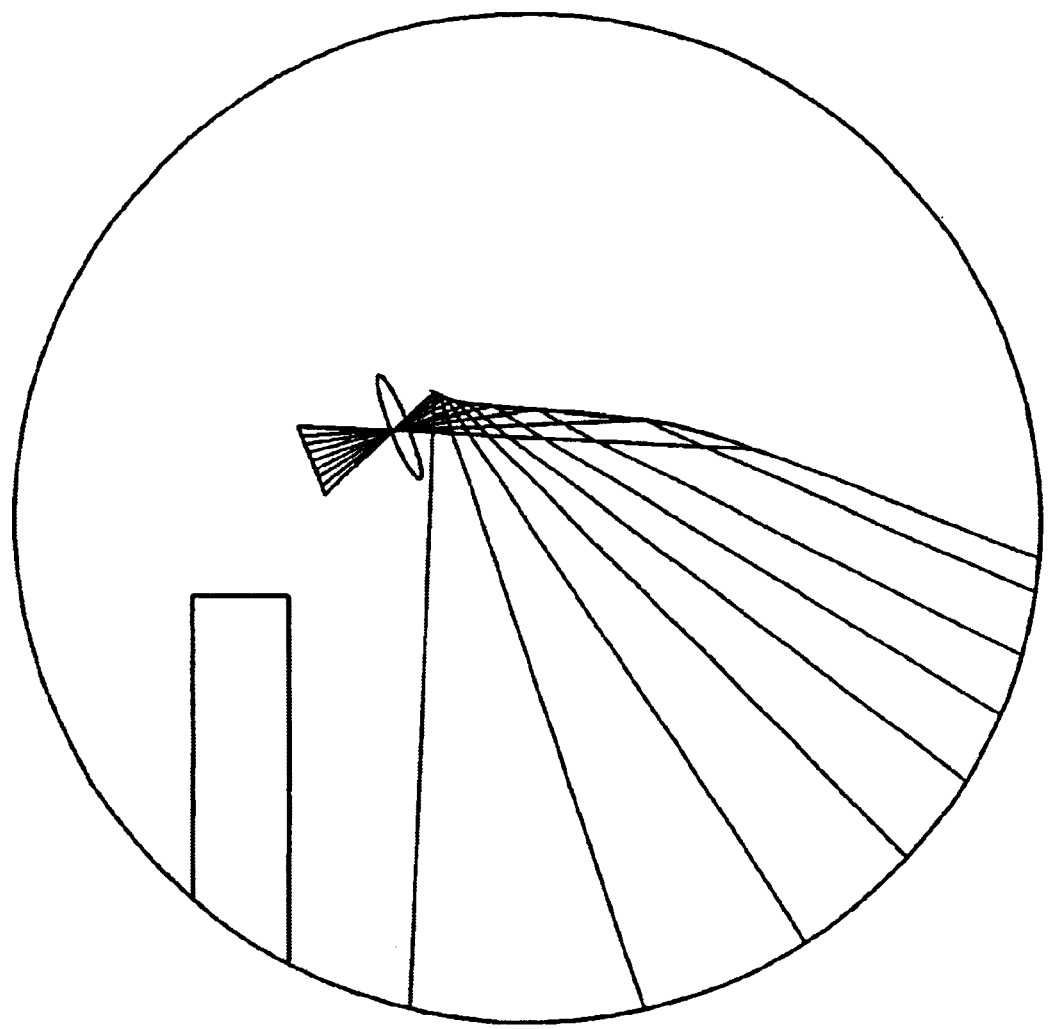
FIG. 9A is an enlarged view of the image plane and optical elements of FIG. 9.
Figure 10:
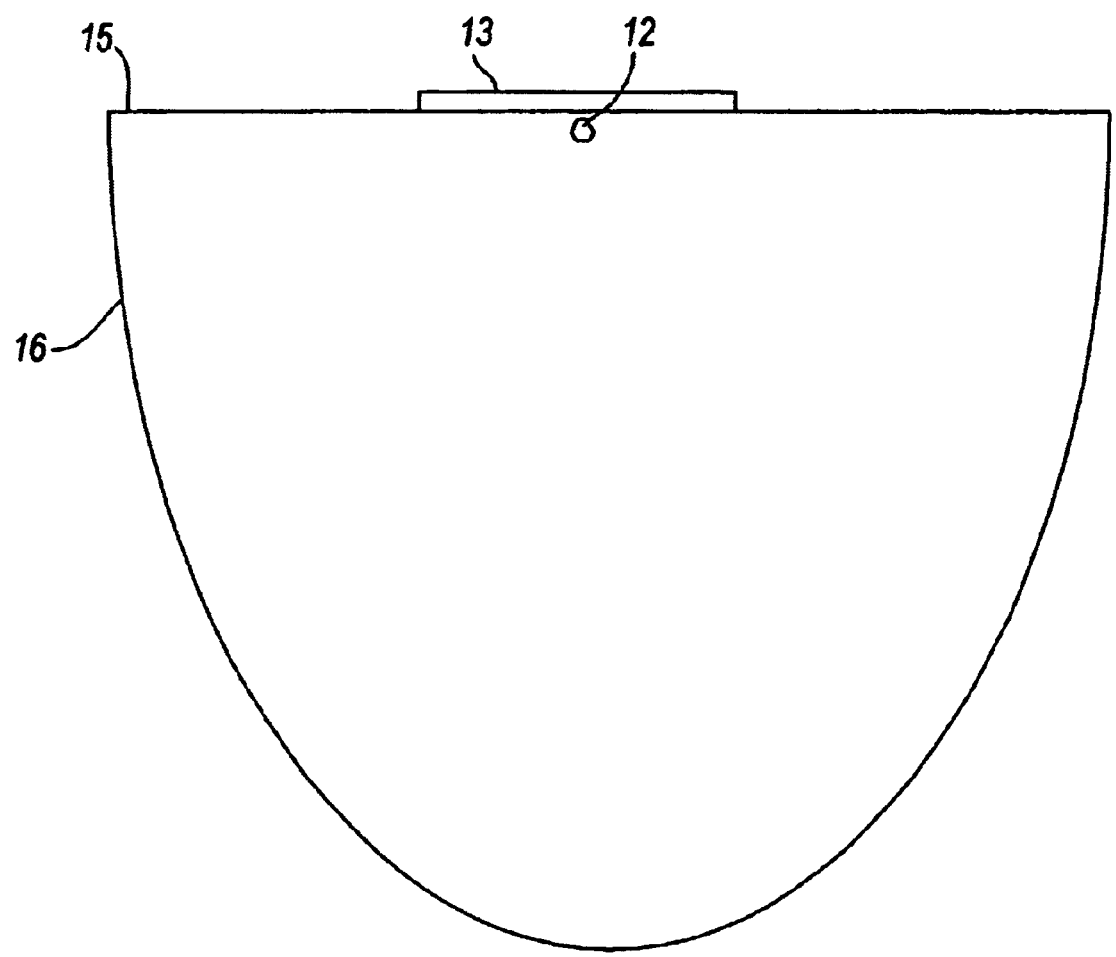
FIG. 10 shows the field of view of the system of FIG. 9.
Figure 11:
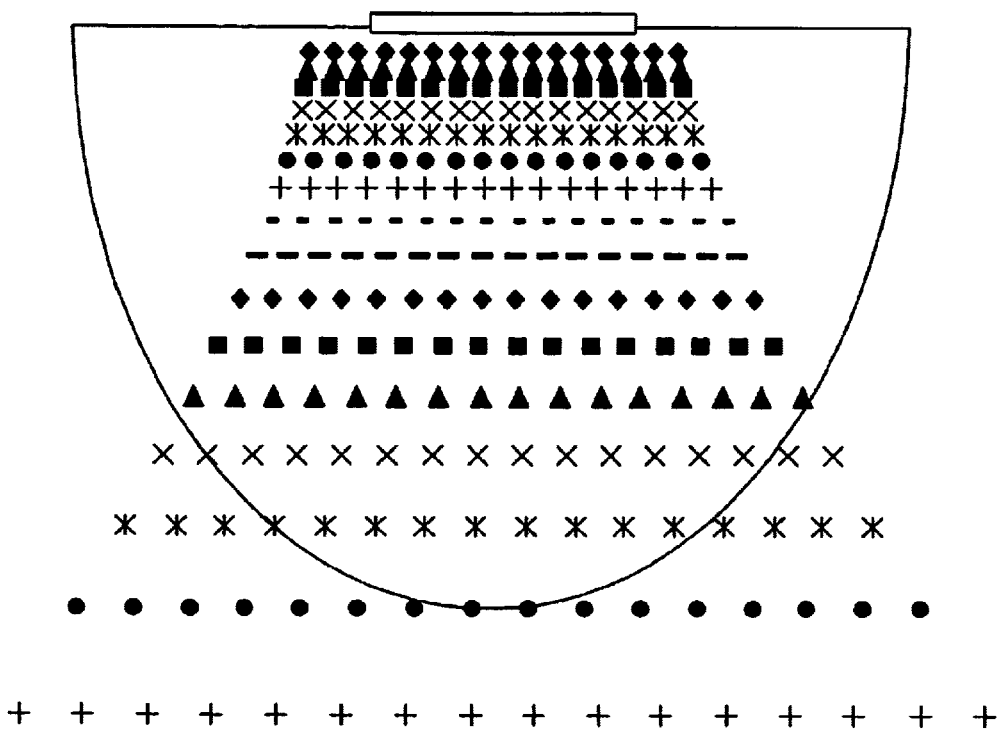
FIG. 11 is a diagram similar to FIG. 3 for the arrangement shown in FIG. 9.
Figure 12:
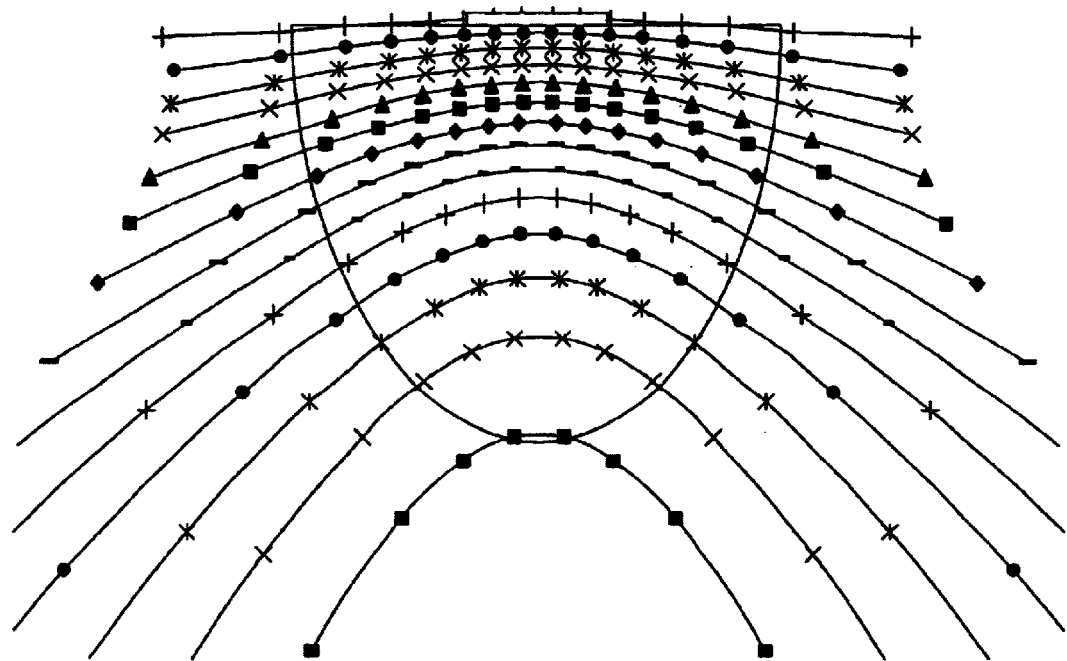
FIG. 12 is a diagram similar to FIG. 6 for the arrangement of FIG. 9 showing the effect of using the reflector illustrated in FIG. 8.

This mirror, 12, is designed to be mounted above a door 13 with a detector array 4, as shown in FIG. 9, so that the door may be automatically opened on the approach of a person. The door is positioned in a straight section of a wall rather than at a corner. The mirror enables the array 4 to view the area of floor 14 in front of the door. FIG. 10 is a plan view of the doorway and shows that the field of view 16 seen by the array must include the areas adjacent to the wall 15 in which the door is located. This is not possible with a conventional optical system mounted above the door, nor is it achieved by an application of the above described prior art methods. A comparison of FIGS. 11 and 12 illustrates how the mirror 12 extends the normal field of view of the array to fully cover the region of ground approaching the door.

In other applications of distorted optics to detector arrays, the same principle may be applied to distort the field of view of a detector array so as to obtain a deliberately non-uniform distribution of pixels over the field of view. This may be done to enhance the performance of algorithms that, for example, are intended to discriminate between objects and count and/or track them as they move around in the object plane.

The optical imaging system of this invention can be used in numerous applications including person or vehicle counters as well as detectors for intruder alarms and automatic door openers as described above.

TABLE 1

Mirror surface coordinates

| x | −80 | −70 | −60 | −50 | −40 | −30 | −20 | −10 | 0 | 10 | 20 | 30 | 40 | 50 | 60 | 70 | 80 |
|---|---|---|---|---|---|---|---|---|---|---|---|---|---|---|---|---|---|
| y | | | | | | | | | z | | | | | | | | |
| 50 | 5.33 | 9.83 | 13.73 | 17.03 | 19.73 | 21.83 | 23.33 | 24.23 | 24.53 | 24.23 | 23.33 | 21.83 | 19.73 | 17.03 | 13.73 | 9.83 | 5.33 |
| 40 | 3.87 | 8.67 | 12.83 | 16.35 | 19.23 | 21.47 | 23.07 | 24.03 | 24.35 | 24.03 | 23.07 | 21.47 | 19.23 | 16.35 | 12.83 | 8.67 | 3.87 |
| 30 | 3.10 | 8.20 | 12.62 | 16.36 | 19.42 | 21.80 | 23.50 | 24.52 | 24.86 | 24.52 | 23.50 | 21.80 | 19.42 | 16.36 | 12.62 | 8.20 | 3.10 |
| 20 | 2.97 | 8.37 | 13.05 | 17.01 | 20.25 | 22.77 | 24.57 | 25.65 | 26.01 | 25.65 | 24.57 | 22.77 | 20.25 | 17.01 | 13.05 | 8.37 | 2.97 |
| 10 | 3.49 | 9.19 | 14.13 | 18.31 | 21.73 | 24.39 | 26.29 | 27.43 | 27.81 | 27.43 | 26.29 | 24.39 | 21.73 | 18.31 | 14.13 | 9.19 | 3.49 |
| 0 | 4.40 | 10.40 | 15.60 | 20.00 | 23.60 | 26.40 | 28.40 | 29.60 | 30.00 | 29.60 | 28.40 | 26.40 | 23.60 | 20.00 | 15.60 | 10.40 | 4.40 |
| −10 | 6.74 | 12.74 | 17.94 | 22.34 | 25.94 | 28.74 | 30.74 | 31.94 | 32.34 | 31.94 | 30.74 | 28.74 | 25.94 | 22.34 | 17.94 | 12.74 | 6.74 |
| −20 | 8.39 | 14.39 | 19.59 | 23.99 | 27.59 | 30.39 | 32.39 | 33.59 | 33.99 | 33.59 | 32.39 | 30.39 | 27.59 | 23.99 | 19.59 | 14.39 | 8.39 |
| −30 | 9.18 | 15.18 | 20.38 | 24.78 | 28.38 | 31.18 | 33.18 | 34.38 | 34.78 | 34.38 | 33.18 | 31.18 | 28.38 | 24.78 | 20.38 | 15.18 | 9.18 |
| −40 | 9.25 | 15.25 | 20.45 | 24.85 | 28.45 | 31.25 | 33.25 | 34.45 | 34.85 | 34.45 | 33.25 | 31.25 | 28.45 | 24.85 | 20.45 | 15.25 | 9.25 |
| −50 | 8.87 | 14.87 | 20.07 | 24.47 | 28.07 | 30.87 | 32.87 | 34.07 | 34.47 | 34.07 | 32.87 | 30.87 | 28.07 | 24.47 | 20.07 | 14.87 | 8.87 |
| −60 | 7.84 | 13.84 | 19.04 | 23.44 | 27.04 | 29.84 | 31.84 | 33.04 | 33.44 | 33.04 | 31.84 | 29.84 | 27.04 | 23.44 | 19.04 | 13.84 | 7.84 |
| −70 | 6.17 | 12.17 | 17.37 | 21.77 | 25.37 | 28.17 | 30.17 | 31.37 | 31.77 | 31.37 | 30.17 | 28.17 | 25.37 | 21.77 | 17.37 | 12.17 | 6.17 |
| −80 | 3.87 | 9.87 | 15.07 | 19.47 | 23.07 | 25.87 | 27.87 | 29.07 | 29.47 | 29.07 | 27.87 | 25.87 | 23.07 | 19.47 | 15.07 | 9.87 | 3.87 |

TABLE 1-continued

Mirror surface coordinates

| x | −80 | −70 | −60 | −50 | −40 | −30 | −20 | −10 | 0 | 10 | 20 | 30 | 40 | 50 | 60 | 70 | 80 |
|---|---|---|---|---|---|---|---|---|---|---|---|---|---|---|---|---|---|
| y | | | | | | | | | z | | | | | | | | |
| −90 | 0.92 | 6.92 | 12.12 | 16.52 | 20.12 | 22.92 | 24.92 | 26.12 | 26.52 | 26.12 | 24.92 | 22.92 | 20.12 | 16.52 | 12.12 | 6.92 | 0.92 |
| −100 | −2.67 | 3.33 | 8.53 | 12.93 | 16.53 | 19.33 | 21.33 | 22.53 | 22.93 | 22.53 | 21.33 | 19.33 | 16.53 | 12.93 | 8.53 | 3.33 | −2.67 |
| −110 | −6.89 | −0.89 | 4.31 | 8.71 | 12.31 | 15.11 | 17.11 | 18.31 | 18.71 | 18.31 | 17.11 | 15.11 | 12.31 | 8.71 | 4.31 | −0.89 | −6.89 |

What is claimed is:

1. An optical detection system comprising a two dimensional array of regularly spaced detector elements and optical means for forming an image of a field of view in an object plane onto an image plane at which the array is located, the optical means being arranged to map a designated area of the object plane onto the array and including a distorting optical element which imposes a non-linear relationship between areas of the object plane and areas of the image plane.

2. A system as claimed in claim 1 in which the designated area has a different shape from that of the detector array.

3. A system as claimed in claim 1 in which a triangular or sector shaped area in the object plane is mapped onto a square or rectangular area in the image plane.

4. A system as claimed in claim 1 in which a "D" shaped area in the object plane is mapped onto a square or rectangular area in the image plane.

5. A system as claimed in claim 1 in which the distorting optical element is a reflective surface.

6. A system as claimed in claim 1 in which the distorting optical element is a refractive element.

7. A system as claimed in claim 1 in which the distorting optical element causes a more uniform correspondence between areas of the object plane and areas of the image plane than would be present without the optical element.

8. A system as claimed in claim 1 including a lens for focussing the image onto the image plane.

9. A system as claimed in claim 1 in which the object plane is an area of floor or ground and the image plane is at an acute angle to the object plane.

* * * * *